(12) United States Patent
Cuvillier et al.

(10) Patent No.: US 10,975,725 B2
(45) Date of Patent: Apr. 13, 2021

(54) TURBOJET ENGINE COMPRISING A SIMPLIFIED BEARING LUBRICATION UNIT

(71) Applicant: Safran Aircraft Engines, Paris (FR)

(72) Inventors: Romain Guillaume Cuvillier, Moissy Cramayel (FR); Nils Edouard Romain Bordoni, Moissy Cramayel (FR); Michel Gilbert Roland Brault, Moissy Cramayel (FR); Jeremy Dievart, Moissy Cramayel (FR); Guillaume Patrice Kubiak, Moissy Cramayel (FR); Arnaud Nicolas Negri, Moissy Cramayel (FR); Nathalie Nowakowski, Moissy Cramayel (FR)

(73) Assignee: Safran Aircraft Engines, Paris (FR)

( * ) Notice: Subject to any disclaimer, the term of this patent is extended or adjusted under 35 U.S.C. 154(b) by 78 days.

(21) Appl. No.: 16/085,366

(22) PCT Filed: Mar. 15, 2017

(86) PCT No.: PCT/FR2017/050598
§ 371 (c)(1),
(2) Date: Sep. 14, 2018

(87) PCT Pub. No.: WO2017/158296
PCT Pub. Date: Sep. 21, 2017

(65) Prior Publication Data
US 2019/0085724 A1 Mar. 21, 2019

(30) Foreign Application Priority Data
Mar. 15, 2016 (FR) ..................................... 1652161

(51) Int. Cl.
*F01D 25/16* (2006.01)
*F02K 3/06* (2006.01)
(Continued)

(52) U.S. Cl.
CPC .............. *F01D 25/16* (2013.01); *F01D 25/20* (2013.01); *F02C 7/06* (2013.01); *F02C 7/36* (2013.01);
(Continued)

(58) Field of Classification Search
CPC ........ F01D 25/162; F01D 25/18; F01D 25/20; F02K 3/06; F02C 7/06; F02C 7/36;
(Continued)

(56) References Cited

U.S. PATENT DOCUMENTS

| 4,531,358 A * | 7/1985 | Smith | F01D 25/20 184/6.11 |
| 8,402,741 B1 * | 3/2013 | Merry | F01D 25/16 60/226.1 |

(Continued)

FOREIGN PATENT DOCUMENTS

| FR | 2 936 273 A1 | 3/2010 |
| WO | WO 2013/141926 A1 | 9/2013 |

OTHER PUBLICATIONS

Search Report dated Dec. 1, 2018 in French Patent Application No. FR 1652151 (with English translation of categories of cited documents), 8 pages.

(Continued)

*Primary Examiner* — Brian P Wolcott
(74) *Attorney, Agent, or Firm* — Oblon, McClelland, Maier & Neustadt, L.L.P.

(57) ABSTRACT

A turbofan including a low-pressure shaft; a high-pressure shaft; a fan shaft; a reducing mechanism that couples the low-pressure shaft to the fan shaft; and a maximum of six chambers that accommodate the bearings of the low-pressure shaft, the bearings of the high-pressure shaft and the bearings of the fan as well as the reducing mechanism.

16 Claims, 14 Drawing Sheets

(51) Int. Cl.
*F02C 7/06* (2006.01)
*F02C 7/36* (2006.01)
*F01D 25/20* (2006.01)

(52) U.S. Cl.
CPC ...... *F02K 3/06* (2013.01); *F05D 2260/40311* (2013.01)

(58) Field of Classification Search
CPC ....... F05D 2260/98; F05D 2260/40311; F05D 2240/50
See application file for complete search history.

(56) References Cited

U.S. PATENT DOCUMENTS

| | | | |
|---|---|---|---|
| 8,672,095 B2* | 3/2014 | Charier | F01D 25/125 184/6.23 |
| 8,911,203 B2* | 12/2014 | Reinhardt | F01D 25/28 415/122.1 |
| 9,849,411 B2* | 12/2017 | Sheridan | F01D 25/20 |
| 9,976,443 B2* | 5/2018 | Coffin | B64D 29/06 |
| 10,094,278 B2* | 10/2018 | Sheridan | F02C 3/06 |
| 10,458,422 B2* | 10/2019 | Gomanne | F04D 13/028 |
| 10,502,081 B2* | 12/2019 | Bioud | F01D 11/04 |
| 2011/0198155 A1 | 8/2011 | Charier et al. | |
| 2013/0177385 A1 | 7/2013 | Munsell et al. | |
| 2013/0192199 A1 | 8/2013 | Merry et al. | |
| 2013/0312419 A1 | 11/2013 | Merry et al. | |
| 2015/0176493 A1* | 6/2015 | Munsell | F01D 25/16 415/175 |
| 2017/0218975 A1* | 8/2017 | Bintz | F02K 1/72 |

OTHER PUBLICATIONS

International Search Report dated May 31, 2017, in PCT/FR2017/050598 filed Mar. 15, 2017.

* cited by examiner

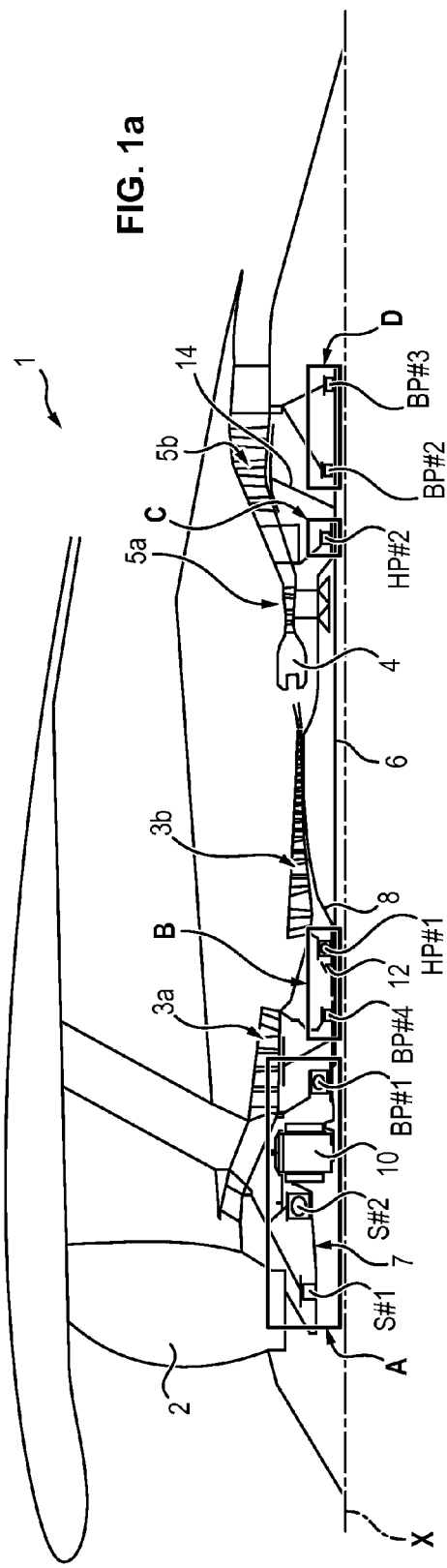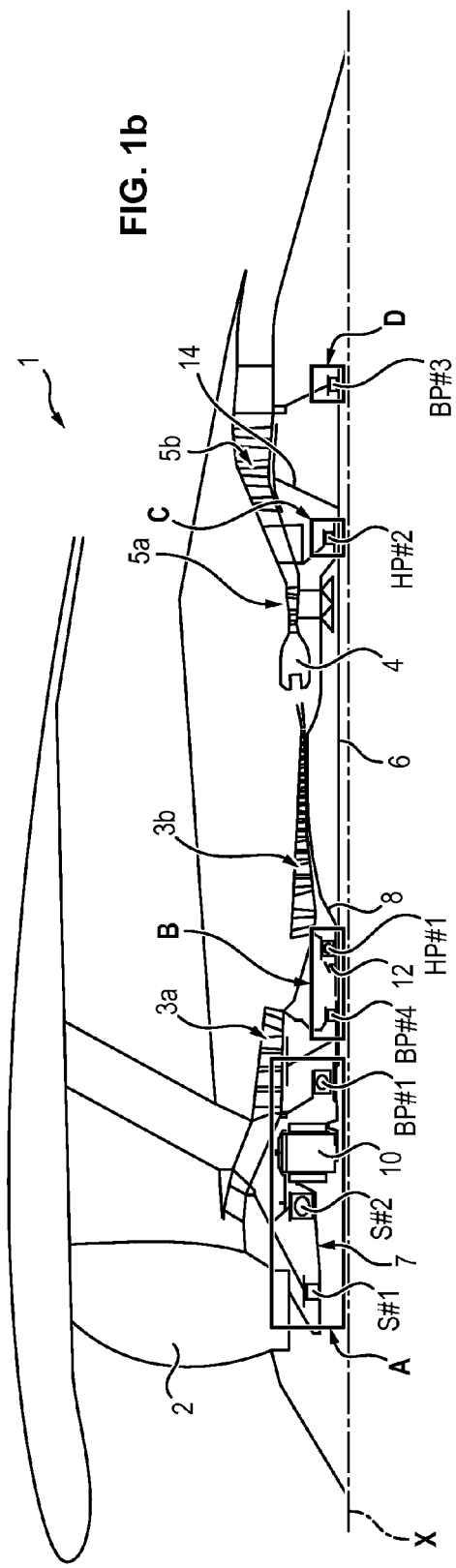

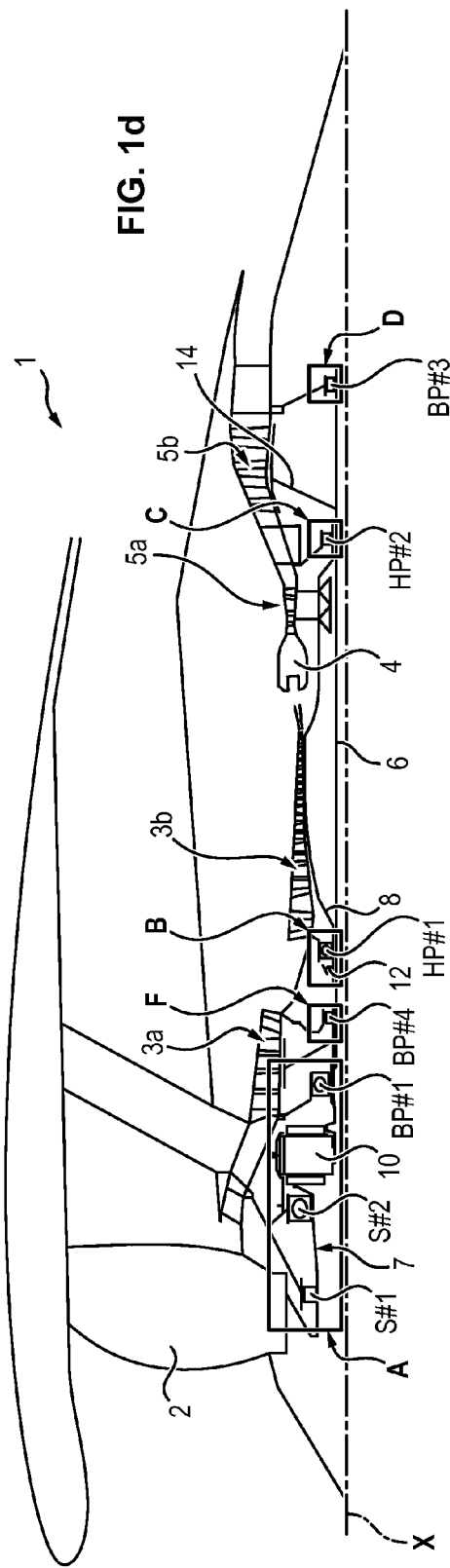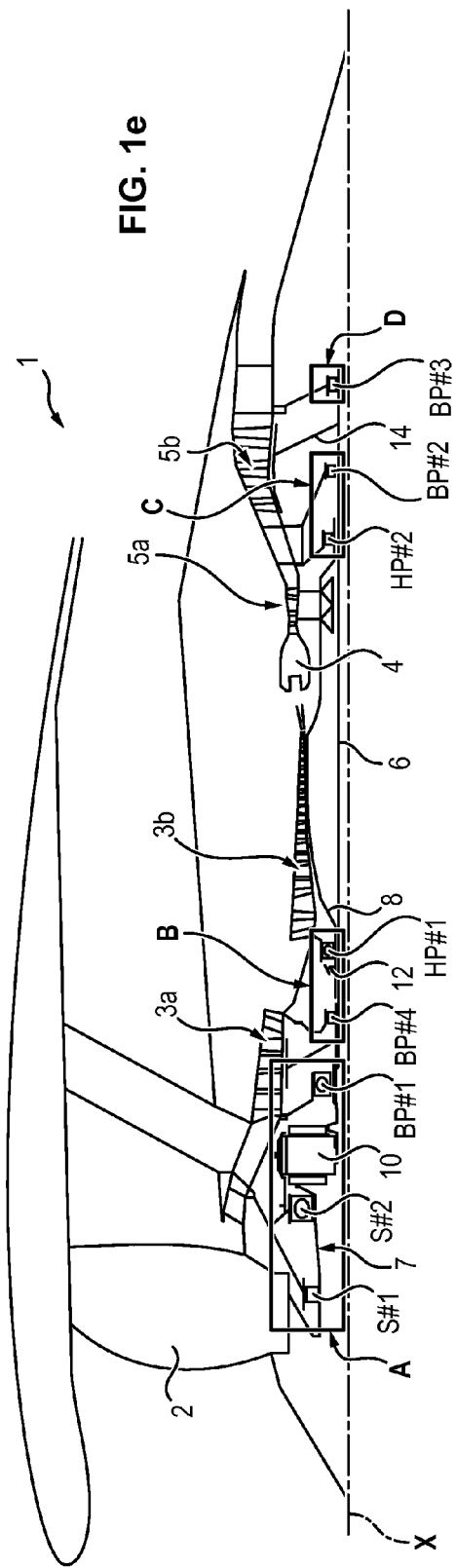

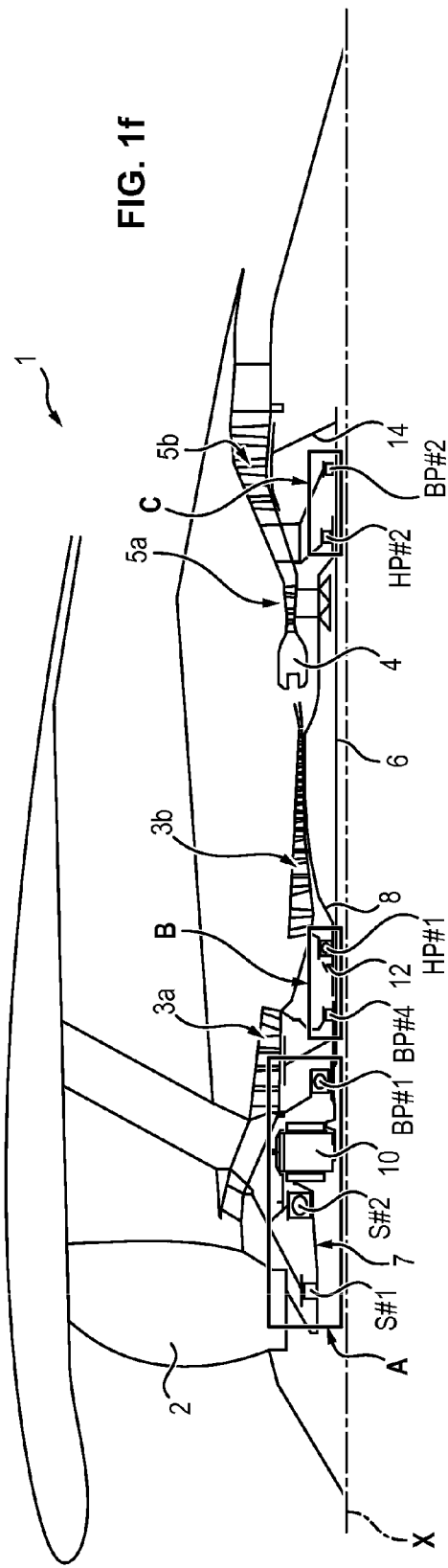
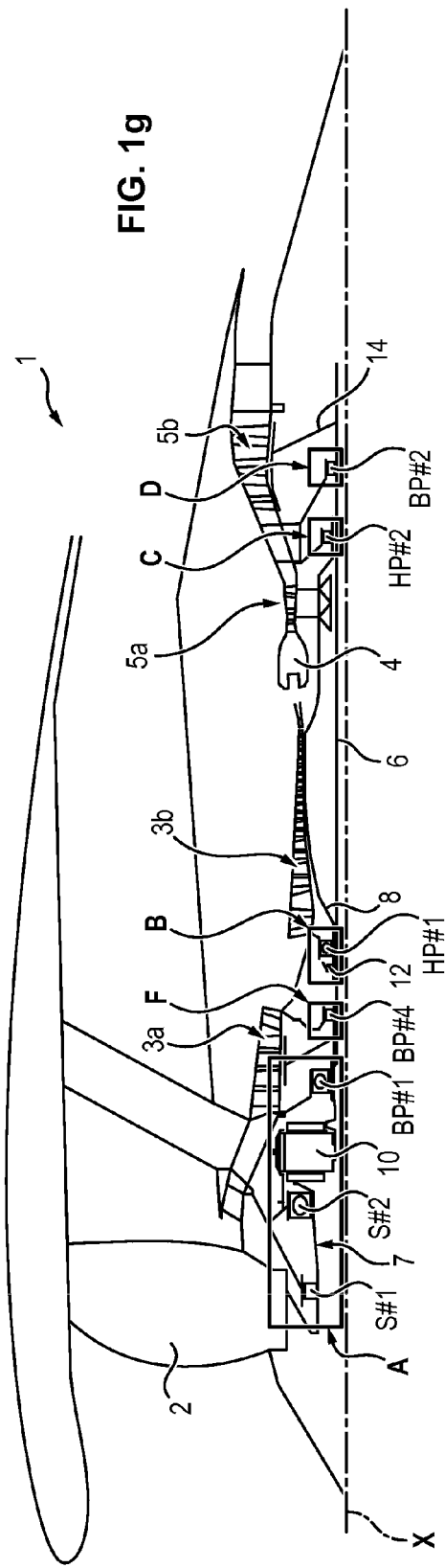

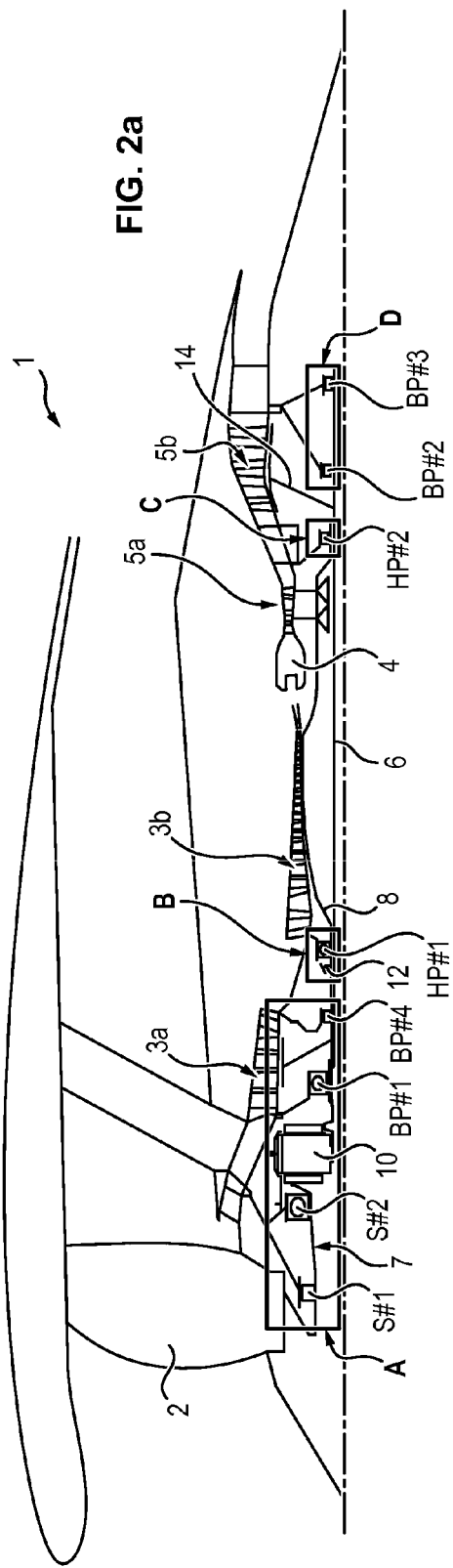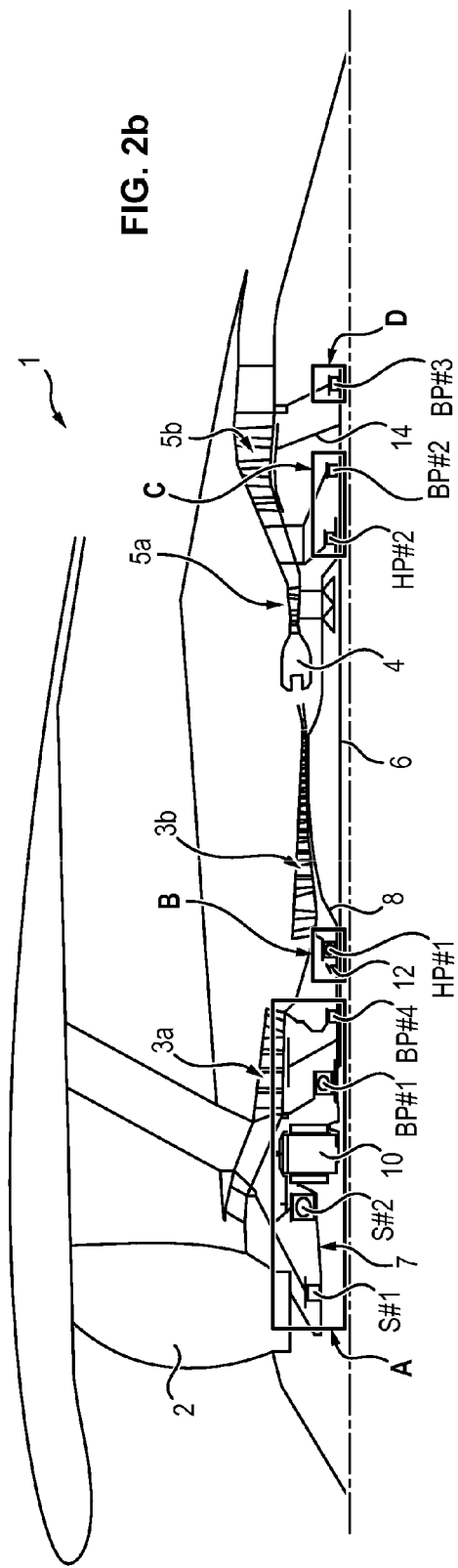

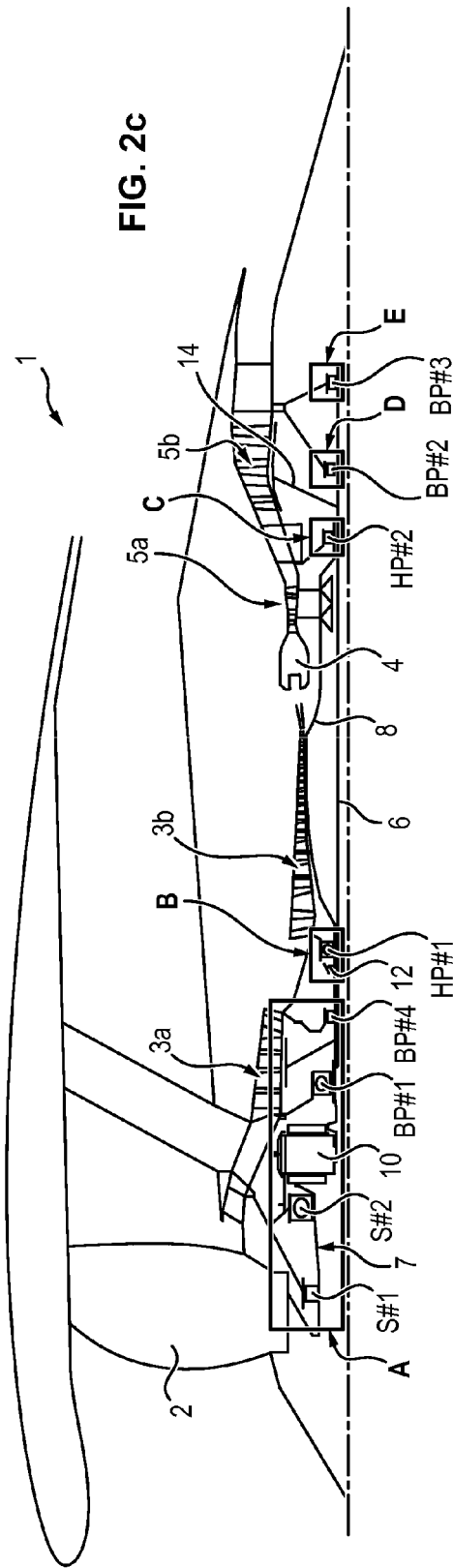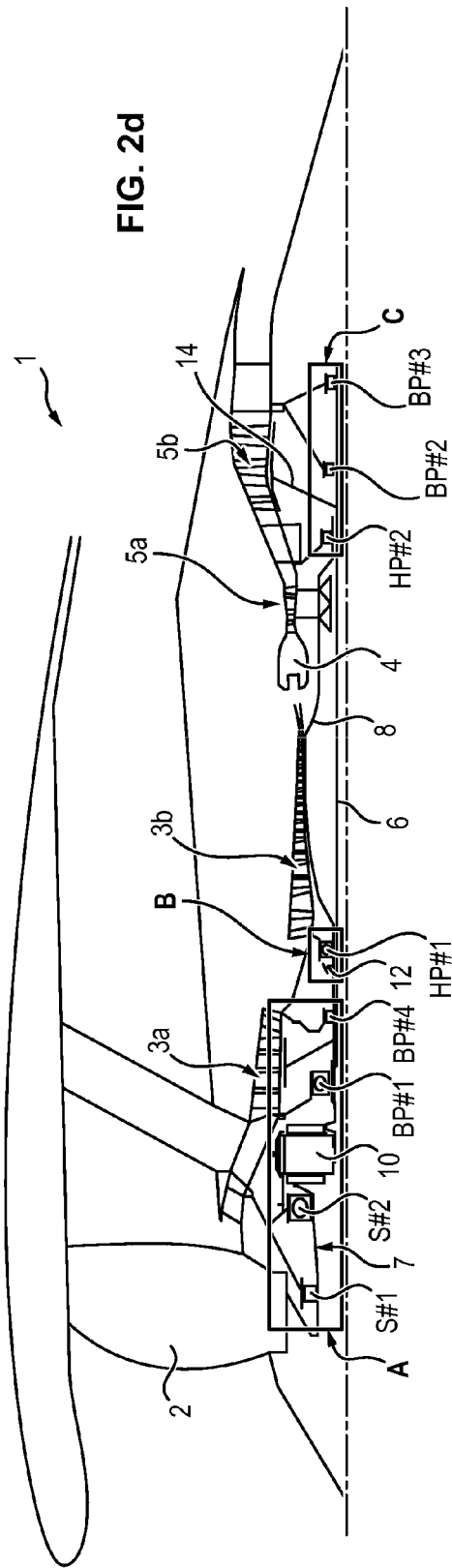

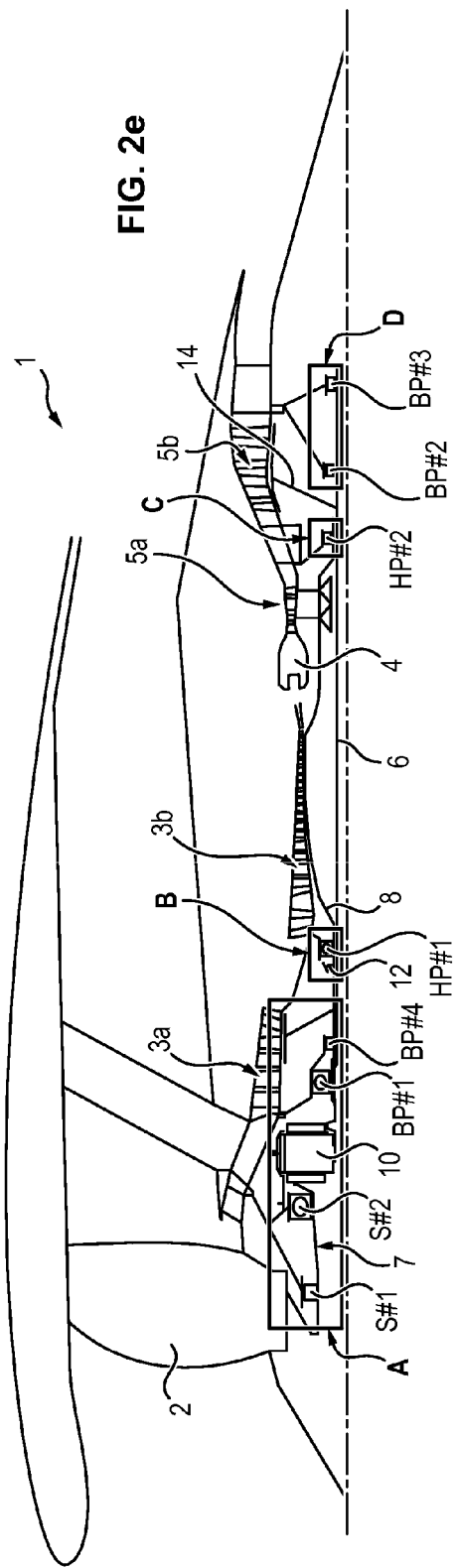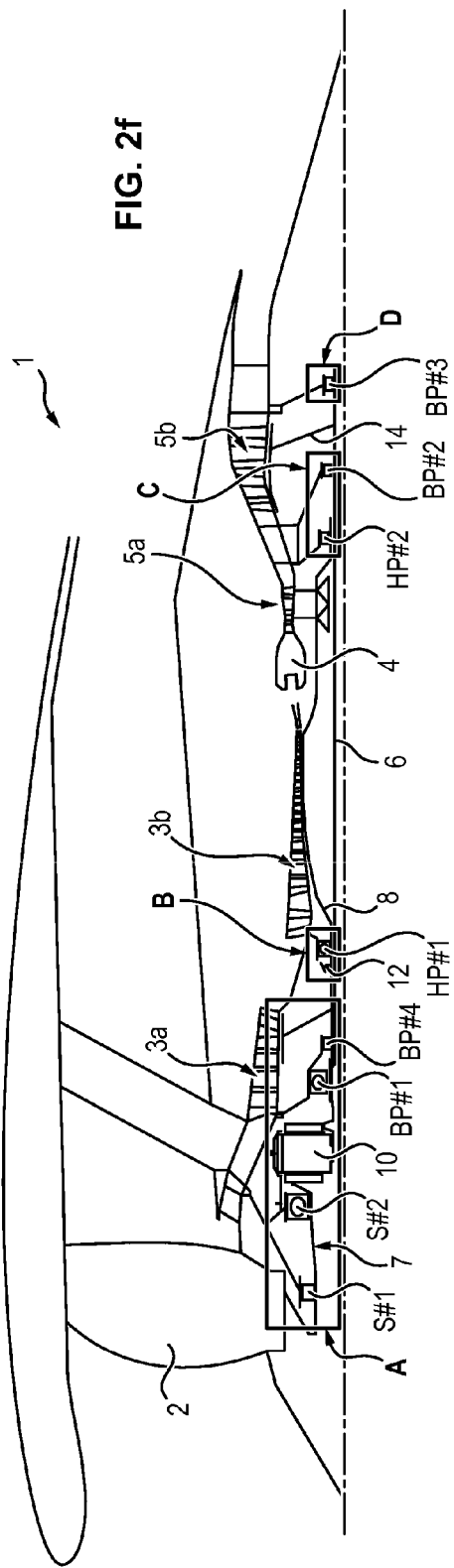

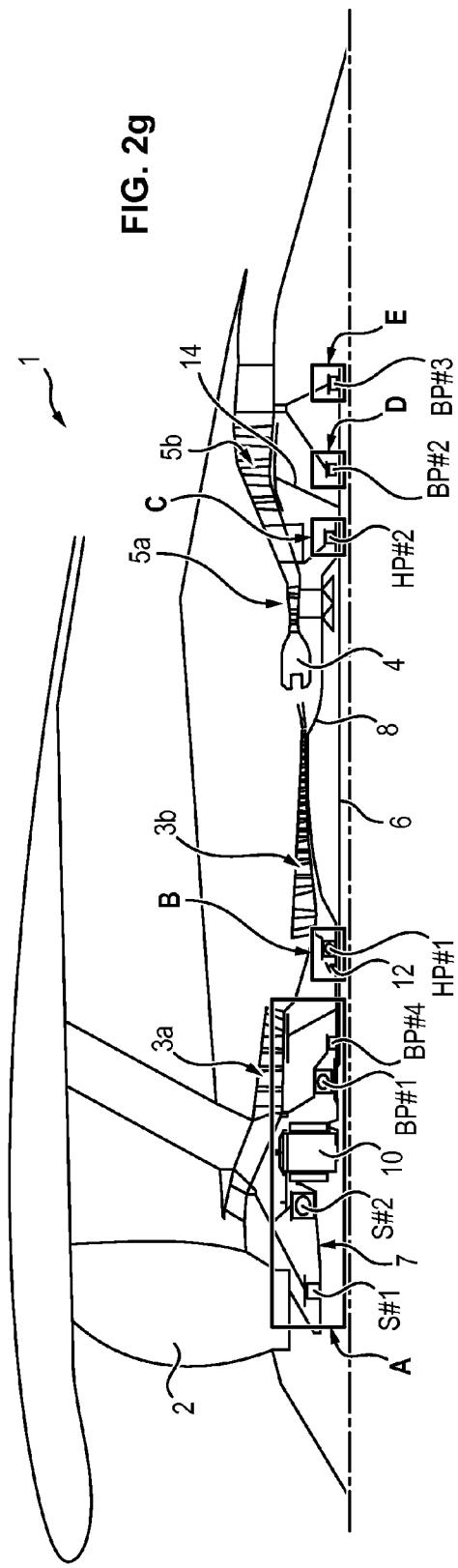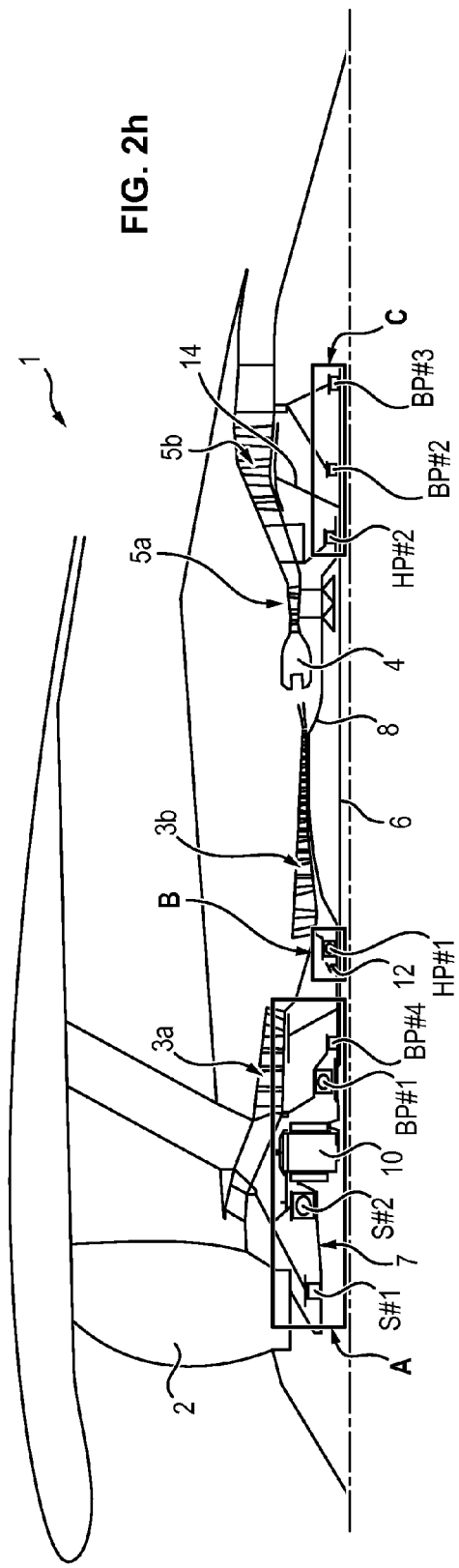

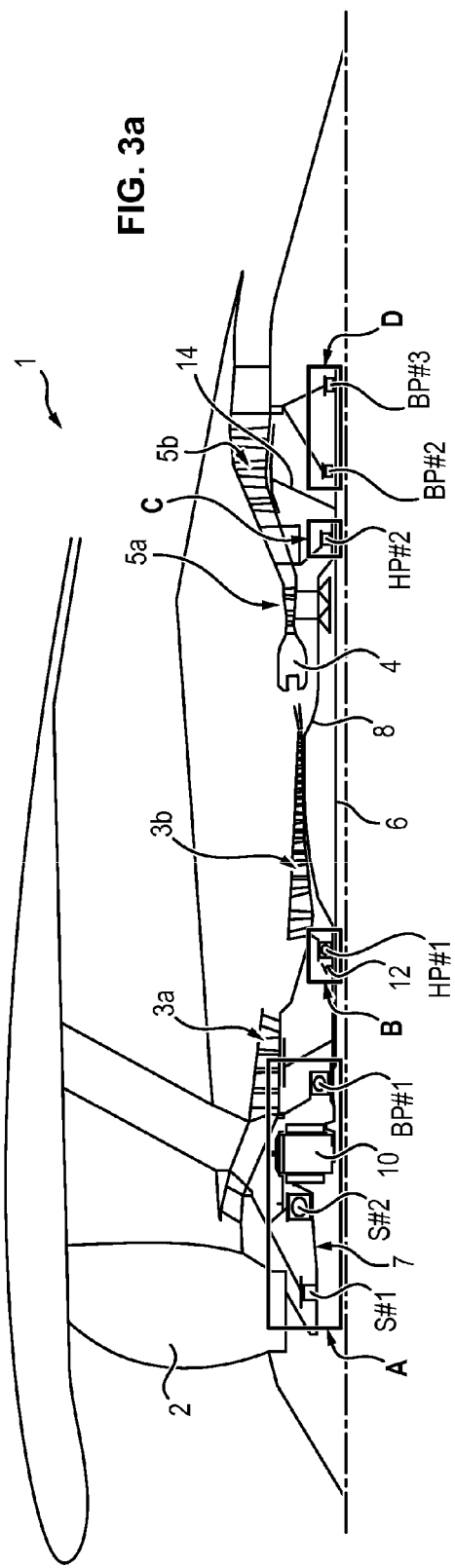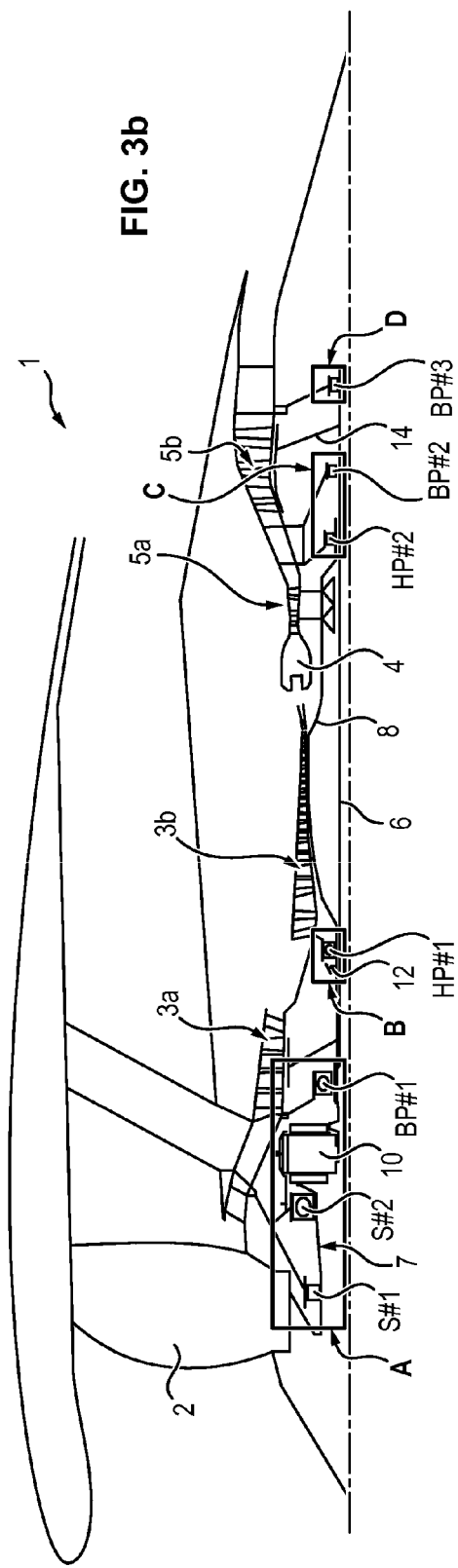

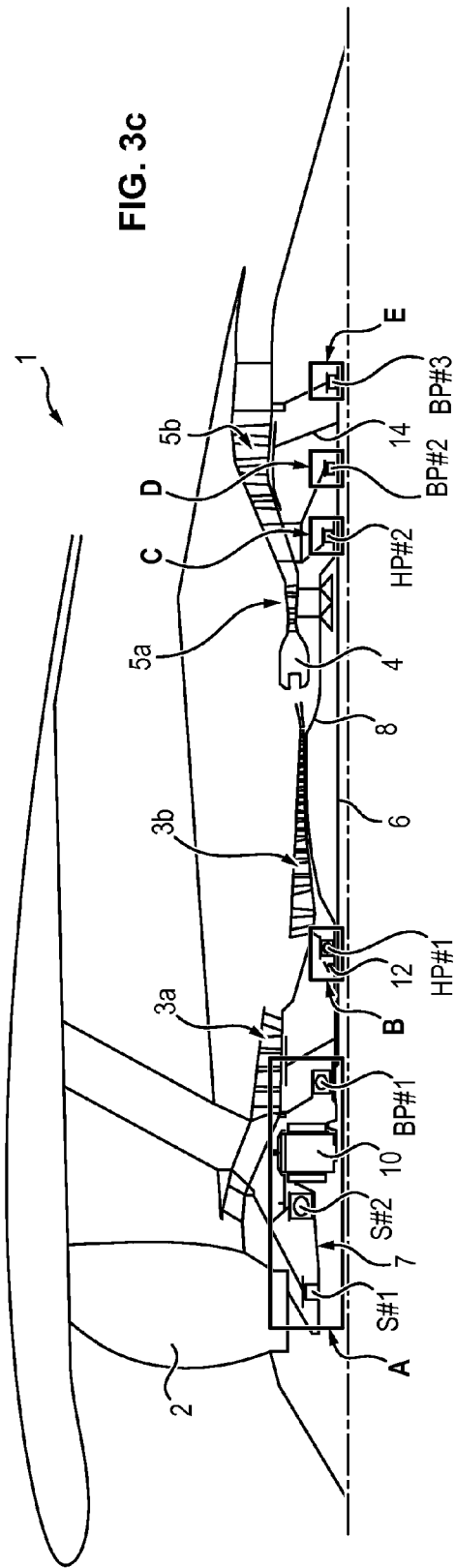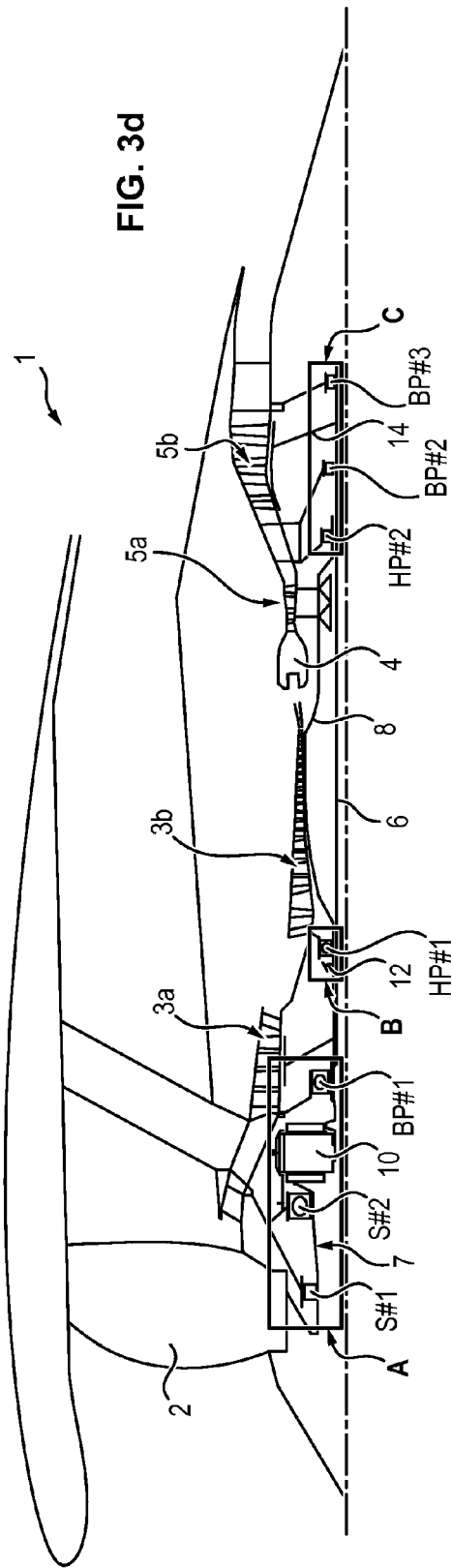

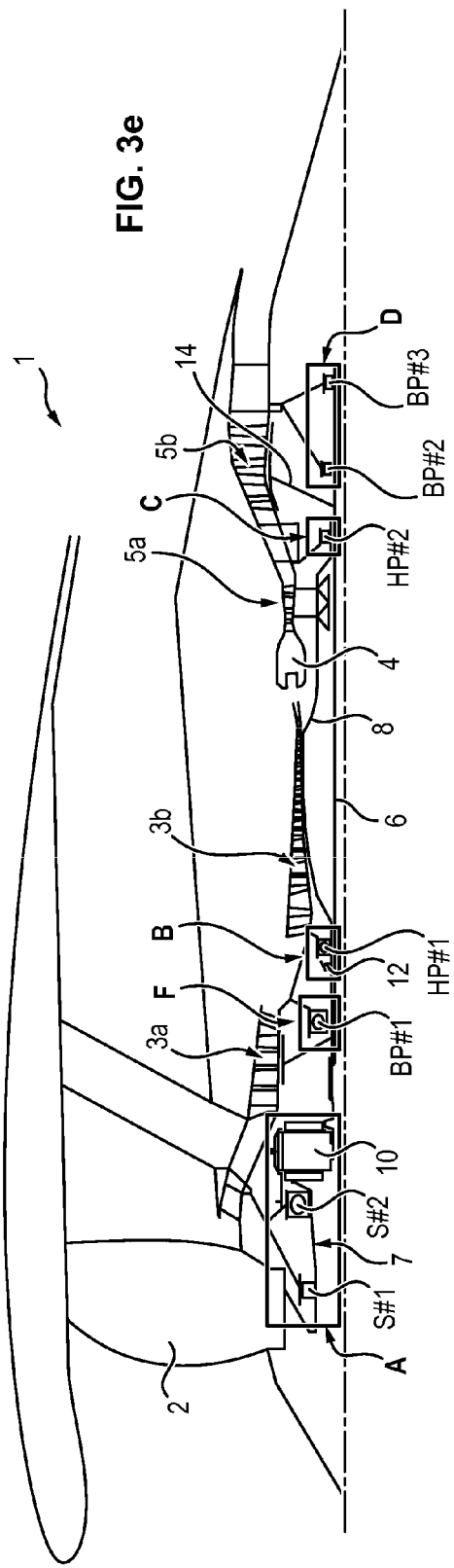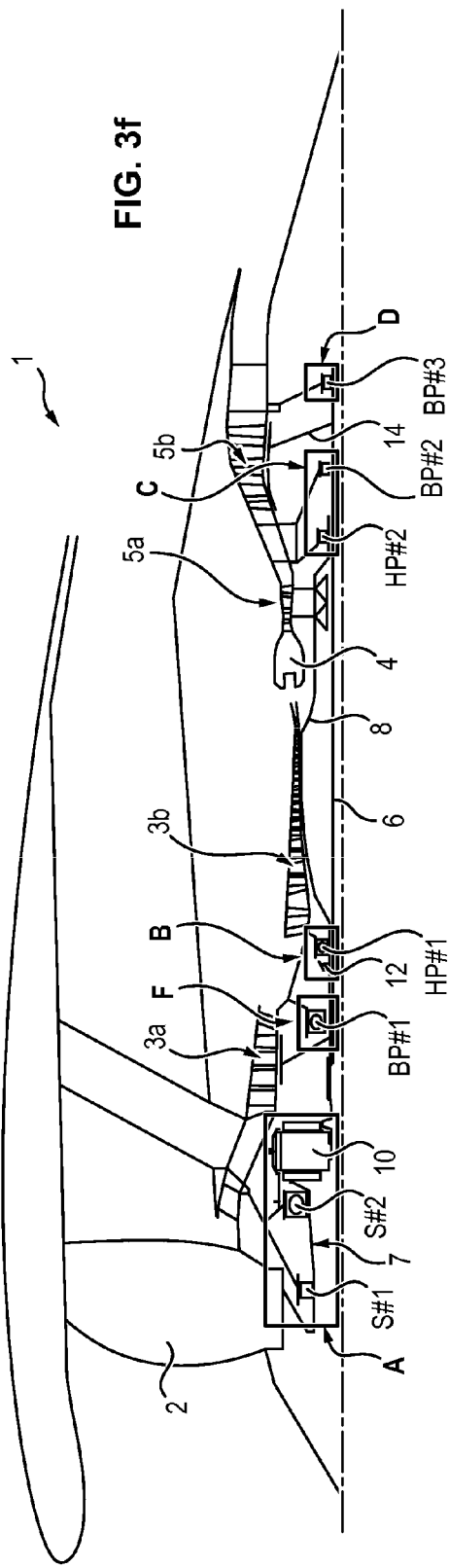

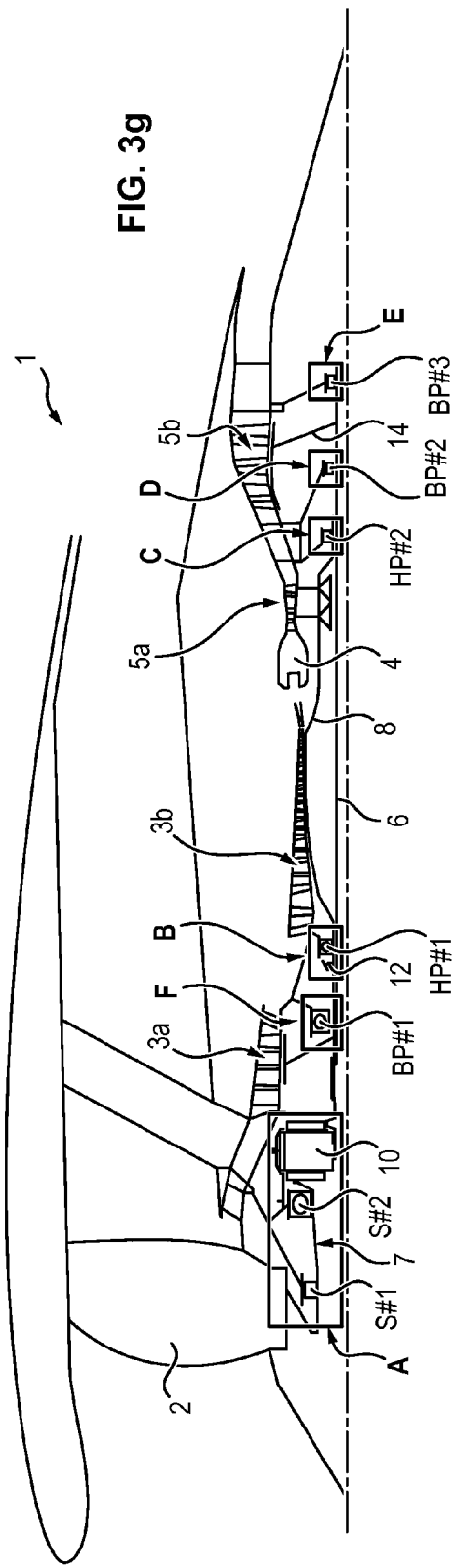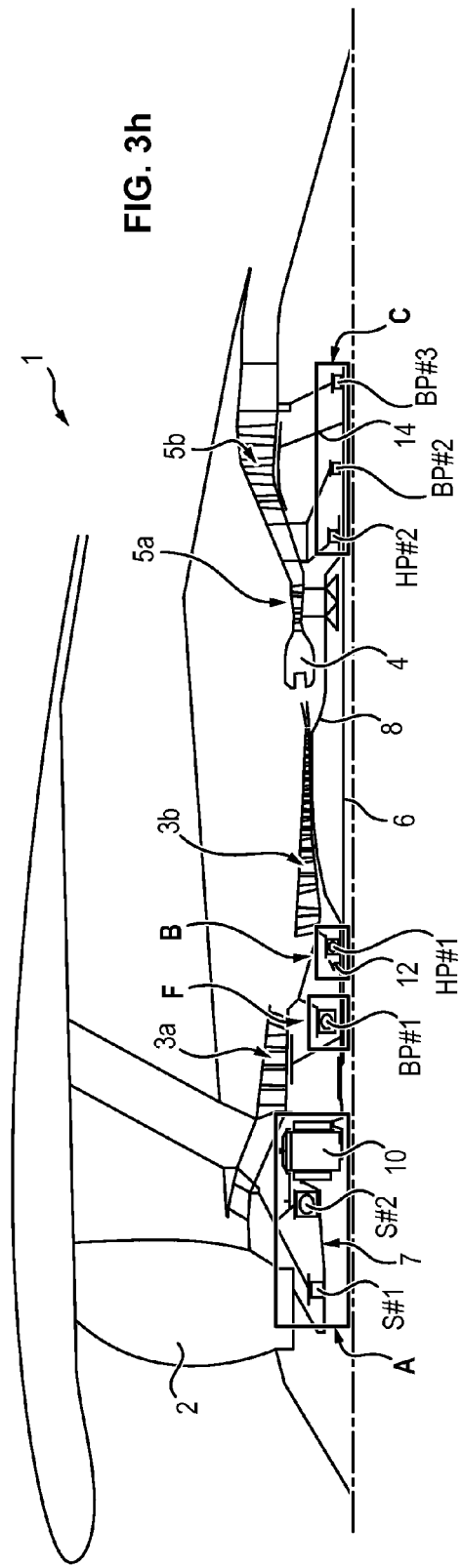

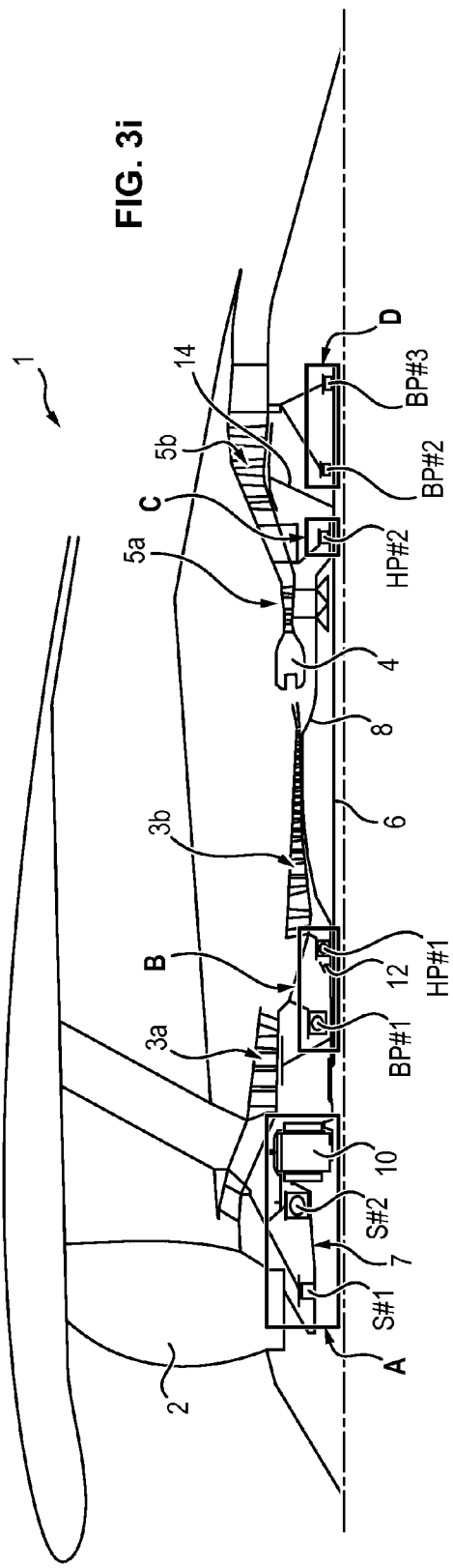
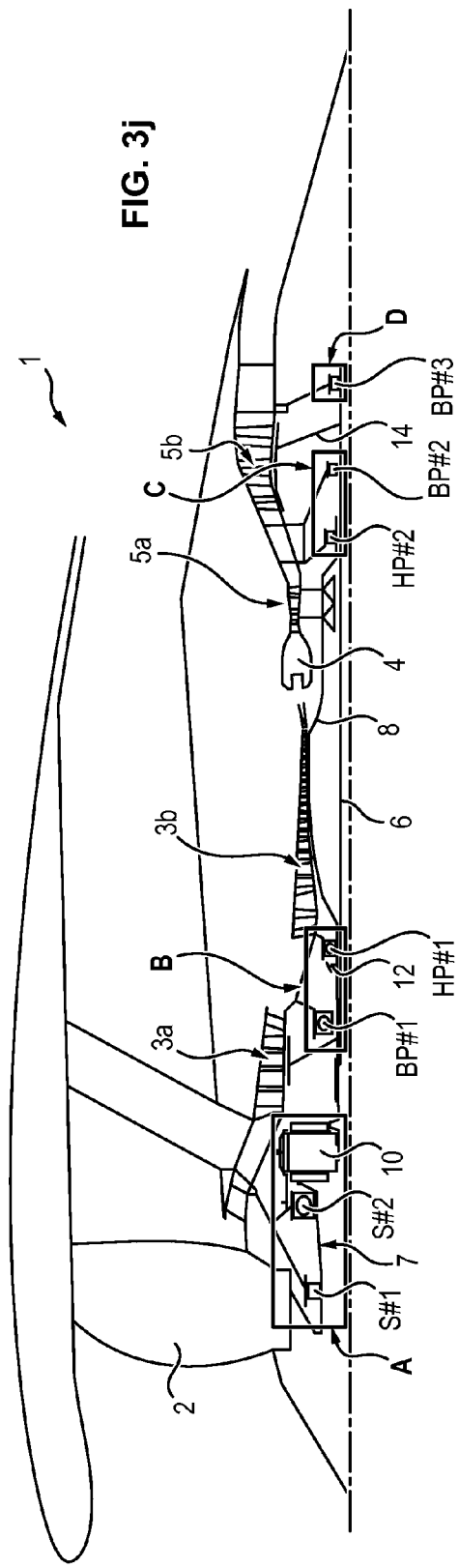

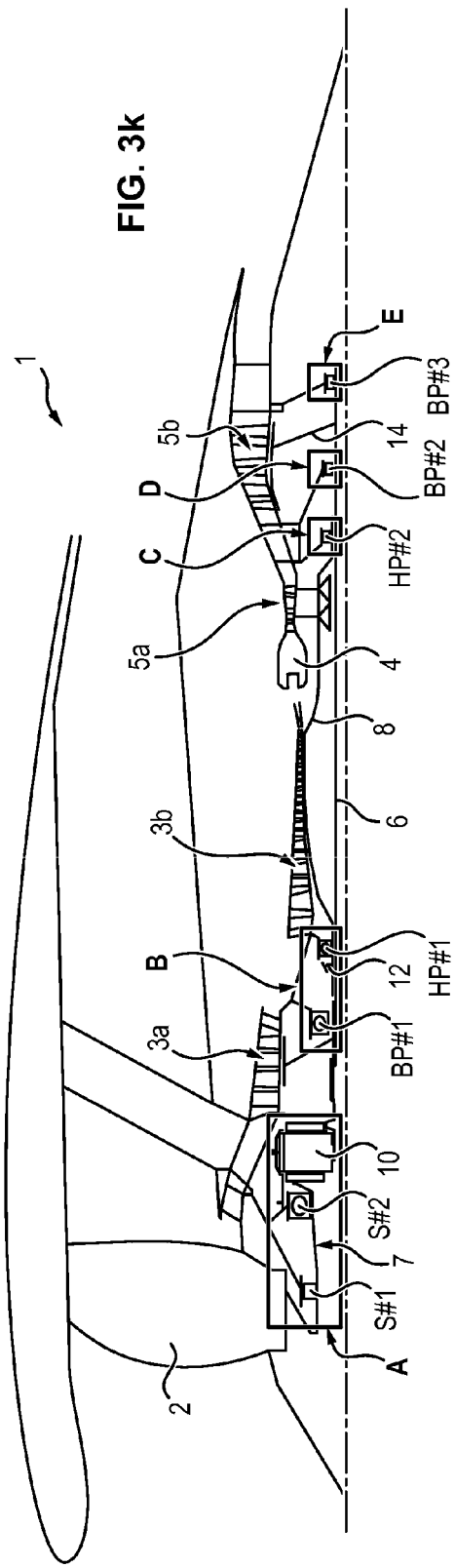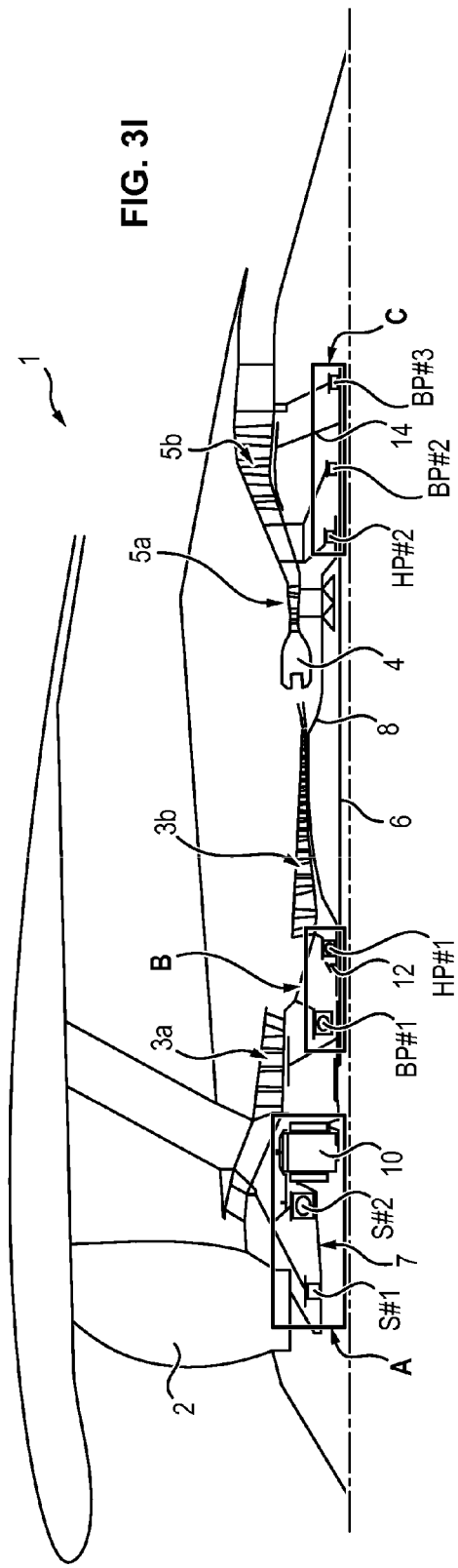

TURBOJET ENGINE COMPRISING A SIMPLIFIED BEARING LUBRICATION UNIT

FIELD OF THE INVENTION

The invention relates to the general field of turbofan engines, and more particularly turbomachines having a high bypass ratio.

TECHNICAL BACKGROUND

A turbofan generally comprises, from upstream to downstream in the gas flow direction, a ducted fan housed in a fan casing, an annular primary flow space and an annular secondary flow space. The air mass suctioned by the fan is therefore divided into a primary flow, which circulates in the primary flow space, and a secondary flow, which is concentric with the primary flow and circulates in the secondary flow space.

The primary flow space passes through a primary body comprising one or more compressor stages, for example a low-pressure compressor and a high-pressure compressor, a combustion chamber, one or more turbine stages, for example a high-pressure turbine and a low-pressure turbine, and a gas exhaust nozzle.

Typically, the high-pressure turbine drives the high-pressure compressor in rotation by means of a first shaft, called high-pressure shaft, while the low-pressure turbine drives the low-pressure compressor in rotation and the fan by means of a second shaft, called low-pressure shaft. The low-pressure shaft is generally housed inside the high-pressure shaft, said shafts being attached to the structural parts of the turbofan by means of bearings.

To improve the propulsive efficiency of the turbofan and reduce its specific fuel consumption as well as the noise emitted by the fan, turbofans have been proposed having a high bypass ratio, which corresponds to the ratio between the secondary (cold) gas flow rate and the flow rate of the primary (hot, passing through the primary body) flow rate.

To achieve such bypass ratios, the fan is decoupled from the low-pressure turbine, thus allowing their respective rotation speeds to be independently optimized. For example, decoupling can be accomplished by means of a reduction gear such as a planetary gear reduction mechanism or a star gear reduction mechanism, placed between the upstream end (with respect to the gas flow direction in the turbofan) of the low-pressure shaft and the fan. The fan is then driven by the low-pressure shaft by means of the reduction mechanism and a supplementary shaft, called fan shaft, which is attached between the reduction mechanism and the fan disk.

This decoupling thus allows a reduction in the rotation speed and the fan pressure ratio, and an increase in the power extracted by the low-pressure turbine. Thanks to the reduction mechanism, the low-pressure shaft can rotate at higher rotation speeds than in conventional turbofans.

The high-pressure shaft is attached to the structural parts of the engine by means of a front bearing HP #1 and a rear bearing HP #2. The front bearing HP #1 is usually mounted on the high-pressure shaft and on the casing that connects the low-pressure compressor and the high-pressure compressor (inter-compressor casing). The rear bearing HP #2, for its part, is mounted on the one hand on the high-pressure shaft and on the other hand on the inter-turbine casing (i.e. on the casing extending between the casing housing the high-pressure turbine and the casing housing the low-pressure turbine).

A third bearing HP #3 can be provided between the front bearing HP #1 and the rear bearing HP #2 if needed.

The low-pressure shaft is generally supported by three bearing BP #1, BP #2 and BP #3. The first bearing BP #1 is located farthest upstream from the low-pressure shaft and can be mounted, on the one hand, on the low-pressure shaft and on the other hand between the reduction mechanism and the booster (on the "inlet" casing). The third bearing BP #3, which is located farthest downstream from the low-pressure shaft, can be mounted on the low-pressure shaft and on the exhaust casing of the turbofan. The position of the bearings BP #1 and BP #3 being conventional, it will not be further detailed hereafter.

The second bearing BP #2, which is adjacent to the third bearing BP #3, can be mounted on the low-pressure shaft and on the inter-turbine casing upstream of the low-pressure turbine, or on the exhaust casing like bearing BP #3. In one embodiment, the second bearing BP #2 extends downstream of the rear bearing HP #2.

The fan shaft, which is mounted between the output of the reduction mechanism and the fan rotor, is further supported by an upstream bearing S #1 disposed underneath the fan and a downstream bearing S #2 disposed at the inlet of the secondary flow space, upstream of the reduction mechanism.

The turbofan further comprises a gear set configured to collect power from the high-pressure shaft. This gear set is generally placed upstream of (and in proximity to) the front bearing HP #1.

These different bearings, the reduction mechanism and the gear set must be lubricated and cooled. To this end, the turbofan generally comprises a lubrication unit supplying a closed oil circuit, enclosures in which the bearings, the reduction mechanism and the gear set are housed, configured to inject oil into the enclosures and recovery pumps configured to recycle the oil which was injected into the enclosures.

In practice, each piece of equipment (i.e. each bearing and the reduction mechanism) is housed in a respective enclosure with which are associated one or more spray nozzles and at least one oil recovery pump.

To this end, each enclosure comprises rollers interleaved between an inner ring and an outer ring coaxial with the axis X of the turbofan and substantially annular. The outer ring can be fixed with respect to the structural elements of the turbofan, while the inner ring is fixed on rotating parts of the turbofan and is therefore movable in rotation around its axis. As a variant, both rings are rotating. The pieces of equipment housed in the enclosures are lubricated and cooled by oil which is projected into the enclosure by spray nozzles to form a fog of droplets in suspension. Sealing means are provided in the zones where the rings join to allow the passage of airflow for the purpose of pressurizing the enclosure and retaining as much oil as possible inside it. Furthermore, one oil recovery pump is provided per enclosure to discharge a volume of oil equivalent to that which is injected into the enclosure via spray nozzles.

When the enclosure houses a bearing, the support of said bearing is for example attached to the outer ring of the enclosure.

Such a configuration thus allows effectively lubricating and cooling these pieces of equipment. However, the enclosures and the recovery pumps have a non-negligible impact on the bulk and the weight of the engine, thus increasing the specific fuel consumption of the turbofan.

SUMMARY OF THE INVENTION

One objective of the invention is therefore to propose a turbofan which has a reduced mass by comparison with conventional turbofans, while still ensuring optimal lubrication and cooling of its equipment, such as bearings and, if required, its reduction mechanism.

For this purpose, the invention proposes a turbofan comprising:
- a low-pressure shaft supported by at least two low-pressure bearings,
- a high-pressure shaft supported by at least two high-pressure bearings,
- a fan shaft supported by at least two fan bearings, and
- a reduction mechanism, coupling the low-pressure shaft and the fan shaft, and
- at most six enclosures housing the low-pressure bearings, the high-pressure bearings, the fan bearings and the reduction mechanism.

Certain preferred but non-limiting features of the turbofan described above are the following, taken individually or in combination:
- the turbofan comprises at most five enclosures,
- each enclosure comprises at most one recovery pump.
- the low-pressure shaft, the high-pressure shaft and the fan shaft are supported by eight or nine bearings in all,
- the fan bearings, the reduction mechanism and at least one low-pressure bearing are housed in the same single enclosure,
- the high-pressure bearings comprise a front high-pressure bearing and a rear high-pressure bearing, the low-pressure bearings comprises a front low-pressure bearing and a rear low-pressure bearing, and the rear high-pressure bearing and the rear low-pressure bearing each being housed in distinct enclosures, and optionally the front high-pressure bearing and the reduction mechanism are housed in distinct enclosures,
- the high-pressure bearings comprise a front high-pressure bearing and a rear high-pressure bearing, the low-pressure bearings comprise a front low-pressure bearing and a rear low-pressure bearing, the rear high-pressure bearing and the rear low-pressure being housed in the same single enclosure, and optionally the front high-pressure bearing and the reduction mechanism are housed in distinct enclosures,
- the low-pressure shaft is supported by at least three low-pressure bearings, a first and a second of said low-pressure bearings being positioned between the fan bearings and the high-pressure bearings, and optionally the first low-pressure bearing is placed in the same single enclosure as the reduction mechanism and the second low-pressure bearing is placed either in the same enclosure as the first low-pressure bearing, or in the same single enclosure as one of the high-pressure bearings,
- the low-pressure shaft is supported by four low-pressure bearings, a first and a second of the low-pressure bearings being positioned between the fan bearings and the high-pressure bearings while a third and a fourth of the low-pressure bearings are positioned downstream of the high-pressure bearings, upstream and downstream being defined according to the direction of gas flow in the turbofan. Optionally, the third low-pressure bearing, the fourth low-pressure bearing and the high-pressure bearings are positioned in distinct enclosures. Also optionally, the high-pressure bearings comprise a front high-pressure bearing and a rear high-pressure bearing, the enclosure of the rear high-pressure bearing, the enclosure of the third low-pressure bearing and the enclosure of the fourth low-pressure bearing being non-ventilated,
- the turbofan has a bypass ratio greater than or equal to 10, preferably greater than or equal to 18, for example between 12 and 18,
- the reduction mechanism comprises a star gear reduction mechanism having a reduction ratio comprised between 2.6 and 5, and/or
- the fan bearings comprise a roller bearing and a ball bearing.

BRIEF DESCRIPTION OF THE DRAWINGS

Other features, aims and advantages of the present invention will appear more clearly upon reading the detailed description that follows, and with reference to the appended drawings given by way of non-limiting example and in which FIGS. 1a to 3l are schematic section views of different embodiments of a turbofan conforming to the invention, in which only one part of the turbofan has been shown.

DETAILED DESCRIPTION OF AN EMBODIMENT

Figure 1C:
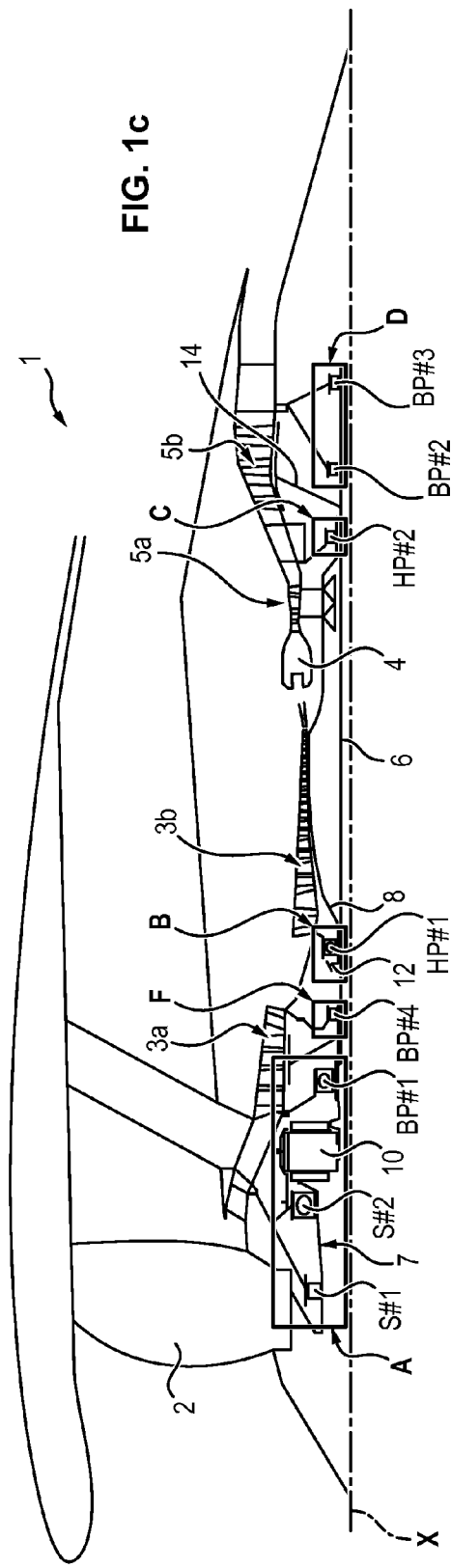

Hereafter, a turbofan 1 will at present be described with reference to the appended figures.

The turbofan 1 comprises, conventionally, a fan 2 and a primary body. The primary body comprises, in the gas flow direction, a low-pressure compressor 3a, a high-pressure compressor 3b, a combustion chamber 4, a high-pressure turbine 5a, a low-pressure turbine 5b and a gas exhaust nozzle.

The fan 2 comprises a fan disk provided with fan blades at its periphery which, when they are put into rotation, drive the airflow in the primary and secondary flow spaces of the turbofan 1. The fan disk is driven in rotation by a low-pressure shaft 6 of the low-pressure turbine 5b.

The turbofan 1 has a high bypass ratio. By high bypass ratio is meant here a bypass ratio greater than 10, for example comprised between 12 and 18. For this purpose, the fan 2 is decoupled from the low-pressure turbine 5b to independently optimize their respective rotation speed, for example by means of a reduction mechanism 10 of the planetary or star gear type, placed between the upstream end (with respect to the gas flow direction in the turbofan 1) of the low-pressure shaft 6 and the fan 2.

The fan 2 is then driven by the low-pressure shaft 6 by means of the reduction mechanism 10 and a fan shaft 7, which is attached between the reduction mechanism 10 and the fan disk.

To calculate the bypass ratio, the flow rate of the secondary flow and the flow rate of the primary flow are measured when the turbofan 1 is stationary in a standard atmosphere (as defined by the manual of the International Civil Aviation Organization (ICAO), Doc 7488/3, $3^{rd}$ edition) and at sea level.

In one embodiment, the reduction mechanism 10 comprises a planetary gear reduction mechanism 10.

The reduction ratio of the reduction mechanism 10 is preferably comprised between 2.6 and 5.

The diameter of the fan 2 can be between eighty inches (203.2 centimeters) and a hundred ten inches (279.4 centimeters), preferably between eighty inches (203.2 centimeters) and ninety inches (228.6 centimeters).

The fan shaft 7, the high-pressure shaft 8 and the low-pressure shaft 6 are centered on the axis X of the turbofan 1 by a series of bearings.

In this particular case, the fan shaft 7 is supported by the upstream bearing S #1 and the downstream bearing S #2, the high-pressure shaft 8 is supported by the front bearing HP #1, the rear bearing HP #2 and if needed a third bearing HP #3, while the low-pressure shaft 6 is supported by the three bearings BP #1, BP #2 and BP #3. These seven or eight bearings being conventional, they will not be further described here.

In one embodiment illustrated in FIGS. 1*a* to 2*h*, the low-pressure shaft 6 can also be supported by a fourth bearing BP #4, placed between the first bearing BP #1, which is the farthest upstream bearing of the low-pressure shaft 6, and the front bearing HP #1 of the high-pressure shaft 8. This fourth bearing BP #4 can in particular be mounted on the low-pressure shaft 6 and on the inter-compressor casing, or between the low-pressure compressor 3*a* and the high-pressure compressor 3*b*.

The mounting of the low-pressure shaft 6 on four bearings BP #1-BP #4 allows the effective displacement of the flexural modes of the low-pressure shaft 6, which is super-critical (that is with a flexural mode in the operating range), so as to position these modes in the transient operating range of the turbofan 1 with safety margins compared with stabilized operating points. By stabilized operating point is meant here an operating point defined by a spectrum of rotation speeds of the low-pressure shaft 6 in which the turbofan 1 can be placed and retained for a relatively long time (comprised between a few minutes and several hours). Examples of stabilized operating points comprise in particular ground idle, flight idle, cruise, or even takeoff. By transient operating point is meant here an operating point corresponding to the passage from one stabilized operating point to another in which the speed of rotation of the low-pressure shaft 6 varies rapidly. In fact, the stabilized operating points do not cover the entire spectrum between idle and redline (a term designating the absolute maximum speed encountered by the low-pressure shaft 6 during the entire flight), so that it may be necessary, depending on stabilized operating point to be attained, to pass through a transient operating point to attain this stabilized operating point.

Thus, thanks to the addition of the low-pressure bearing BP #4, the first deformation mode of the low-pressure shaft 6 is displaced to approximately 8000 rpm, hence between the ground idle operating point (which corresponds to a speed of rotation of the low-pressure shaft of 2000 to 4500 rpm and the cruise operating point (which corresponds to a speed of rotation of the low-pressure shaft of 8500 to 9500 rpm) for a turbofan 1 having a redline comprised between 10,000 rpm and 12,000 rpm. It further becomes possible to reduce the diameter of the low-pressure shaft 6 and hence the bulk of the primary body to attain, with the reduction mechanism 10 and the considerable diameter of the fan 2, a high bypass ratio for the turbofan 1. Typically, the low-pressure shaft 6 can have an outer diameter less than fifty millimeters, for example less than forty-five millimeters.

This positioning of the bearings BP #1 and BP #4 further allows a reduction of the use of clearances (radial displacements) of the low-pressure compressor 3*a*, this currently being placed between two bearings BP #1 and BP #4.

The turbofan 1 further comprises a gear set 12 configured to collect power on the high-pressure shaft 8. Here, this is a gear set using a conical gear connected to a radial shaft. This gear set 12 is placed here upstream of the front bearing HP #1.

The turbofan 1 comprises at most six enclosures A-F, configured to contain the oil introduced by the spray nozzles in order to lubricate and cool all the bearings S #1, S #2, HP #1, HP #2, BP #1-BP #4 and the reduction mechanism 10. More precisely, the turbofan 1 can comprises exactly three (A-C), four (A-D), five (A-E) enclosures or six (A-F) enclosures. These enclosures are illustrated schematically in the figures.

Likewise, the turbofan 1 comprises at most six recovery pumps (not visible in the figures), configured to recycle the oil which was injected into the enclosures. More precisely, the turbofan 1 comprises at most one recovery pump per enclosure.

To this end, the two fan bearings S #1 and S #2 and the reduction mechanism 10, and optionally the low-pressure bearing BP #1, can be housed in the same enclosure A. A recovery pump is then associated with this enclosure A. The other bearings can be housed in dedicated enclosures or, on the contrary, in several common enclosures, so as to reduce the number of enclosures necessary. It will be noted that for these other bearings, a maximum of one oil recovery pump per enclosure is necessary. Typically, the same single recovery pump can be used for two enclosures, or even three enclosures.

The number of enclosures is therefore strongly reduced in comparison with the prior art, which places each piece of equipment (bearing #1, S #2, HP #1, HP #2, BP #1-BP #4 or reduction mechanism 10) in an enclosure. This reduction in the number of enclosures further allows reducing recovery pumps by at least the same number, because such a pump was systematically associated with an enclosure in the prior art. The mass of the turbofan 1 is thus very strongly reduced, the radial and axial bulk resulting from the presence of the enclosures A-F. The lubrication circuit is further strongly simplified, due the reduction in the number of recovery pumps.

In the exemplary embodiments shown in FIGS. 1*a* to 2*h*, the turbofan 1 comprises two fan bearings S #1 and S #2, a reduction mechanism 10, two high-pressure bearings HP #1 and HP #2 and four low-pressure bearings BP #1, BP #2, BP #3 and BP #4.

The turbofan 1 can then comprise exactly three, four or five enclosures, the bearings and the reduction mechanism 10 being distributed as follows in these enclosures.

In the exemplary embodiment illustrated in FIG. 1*a*, the turbofan 1 comprises four enclosures A-D, each enclosure comprising at most one recovery pump:
- one enclosure A housing the two fan bearings S #1 and S #2, the reduction mechanism 10 and the low-pressure bearing BP #1,
- one enclosure B housing the low-pressure bearing BP #4 and the front high-pressure bearing HP #1.
- one enclosure C housing the rear high-pressure bearing HP #2.
- one enclosure D housing the low-pressure bearings BP #2 and BP #3.

In this exemplary embodiment, the turbofan 1 therefore comprises at more four recovery pumps, namely one recovery pump per enclosure A to D.

As a variant, the turbofan 1 can comprise exactly three recovery pumps, namely one pump for enclosure A, one pump for enclosure B, and one pump configured to recover the oil in enclosures C and D.

The second and third low-pressure bearing BP #2 and BP #3 are connected to the exhaust casing and the low-pressure shaft is connected to the low-pressure turbine casing.

It will be noted that generally, when the second and the third low-pressure bearings BP #2 and BP #3 are housed in the same single enclosure (as illustrated for example in FIG. 1*a*, but also in the embodiments of FIGS. 1*c*, 2*a*, 2*e*,3*a*, 3*e* and 3*i*), the second bearing BP #2 is preferably attached to the exhaust casing. Furthermore, when the second low-pressure bearing BP #2 and the rear high-pressure bearing HP #2 are housed in the same single enclosure (as illustrated for example in FIG. 1*e*, if, 2*b*, 2*f*, 3*b*, 3*f* and 3*j*), the second bearing BP #2 is preferably attached to the inter-turbine casing. However, when the second low-pressure bearing BP #2, the third low-pressure bearing BP #3 and the rear bearing HP #2 of the high-pressure shaft are housed in the same single enclosure or in three distinct enclosures, the second bearing BP #2 can be attached either to the exhaust casing (as illustrated in particular in FIGS. 2*c* and 2*d*) or to the inter-turbine casing (as illustrated in particular in FIGS. 3*c* and 3*d*).

Optionally, the low-pressure shaft is further connected to the low-pressure turbine by a connection 14, between the rear bearing HP #2 and the second low-pressure bearing BP #2.

In one embodiment, the turbofan 1 can comprise exactly three recovery pumps, namely one pump for enclosure A, one pump for enclosure B and one pump configured to recover the oil in enclosures C and D.

The exemplary embodiment illustrated in FIG. 1*b* is identical to that illustrated in FIG. 1*a*, except that the turbofan does not comprise a second low-pressure bearing BP #2. The low-pressure shaft is therefore supported by only one bearing (BP #3) in the downstream part. It is further connected to the low-pressure turbine by a connection 14, between the rear bearing HP #2 and the third low-pressure bearing BP #3. In this exemplary embodiment, the turbofan therefore comprises at most four recovery pumps, namely one recovery pump per enclosure A to D. As a variant, the turbofan 1 can comprise exactly three recovery pumps, namely one pump for enclosure A, one pump for enclosure B and a pump configured to recover the oil in enclosures C and D.

The exemplary embodiments illustrated in FIGS. 1*c* and 1*d* are identical to those illustrated in FIGS. 1*a* and 1*b*, respectively, except that the low-pressure bearing BP #4 and the front high-pressure bearing HP #1 are housed in distinct enclosures E and B. In this exemplary embodiment, the turbofan 1 can comprise one recovery pump per enclosure E, B or as a variant a single recovery pump for both enclosures E, B.

The exemplary embodiment illustrated in FIG. 1*l* is identical to that illustrated in FIG. 1*a*, except that the low-pressure bearing BP #2 is placed in the enclosure C (with the rear bearing HP #2) and is connected to the inter-turbine casing. In this exemplary embodiment, the turbofan 1 therefore comprises at most four recovery pumps, namely one recovery pump per enclosure A to D. In one embodiment, the turbofan 1 can comprise exactly three recovery pumps, namely one pump for enclosure A, one pump for enclosure B and one pump configured to recover the oil in enclosures C and D.

The exemplary embodiment illustrated in FIG. 1*f* is identical to that illustrated in FIG. 1*e*, except that the turbofan does not comprise a third low-pressure bearing BP #3. In this exemplary embodiment, the turbofan 1 therefore comprises at most three recovery pumps, namely one recovery pump per enclosure A to C.

The exemplary embodiment illustrated in FIG. 1*g* is identical to that illustrated in FIG. 1*f*, except that the rear high-pressure bearing HP #2 and the second low-pressure bearing BP #2 are each placed in a respective enclosure C and D. In this exemplary embodiment, the turbofan 1 therefore comprises four enclosures A-D, each enclosure comprising at most one recovery pump. In one embodiment, the turbofan 1 can comprise exactly three recovery pumps, namely one pump for enclosure A, one pump for enclosure B and one pump configured to recover the oil in enclosures C and D.

As a variant, one exemplary embodiment (not shown) identical to that illustrated in FIG. 1*e* can also be considered, with as its only modification with respect to FIG. 1*e* the fact that the rear high-pressure bearing HP #2 and the low-pressure bearings BP #2 and BP #3 are placed in a single enclosure. If necessary, the second low-pressure bearing BP #2 can be connected either to the inter-turbine casing, or to the exhaust casing. In this exemplary embodiment, the turbofan 1 therefore comprises three enclosures A-C, each enclosure comprising at most one recovery pump.

As a variant, another exemplary embodiment (not shown) identical to that illustrated in FIG. 1*e* can also be considered, with as its sole modification with respect to FIG. 1*e* the fact that the rear high-pressure bearing HP #2 and the low-pressure bearings BP #2 and BP #3 are each placed in a dedicated enclosure. If necessary, the second low-pressure bearing BP #2 can be connected either to the inter-turbine casing or to the exhaust casing. In this exemplary embodiment, the turbofan 1 therefore comprises five enclosures A-E, each enclosure comprising at most one recovery pump. As a variant, the turbofan can comprise exactly 3 or 4 recovery pumps, using a single recovery pump for recovering the oil from enclosures C and D, or D and E, or C, D and E.

It will be noted that, regardless of the exemplary embodiment, the low-pressure bearing BP #4 and the front high-pressure bearing HP #1 can be housed either in the same single enclosure B, or in separated enclosures (as illustrated in FIGS. 1*c* and 1*d*). Thus, it is possible to obtain a turbofan comprising up to six enclosures A-F (i.e. a turbofan 1 comprising three enclosures A, B and F upstream of the combustion chamber, as illustrated in FIG. 1*c*, and three enclosures C, D and E downstream, as illustrated in particular in FIGS. 2*c* and 3*c*).

In the exemplary embodiment illustrated in FIG. 2*a*, the turbofan 1 comprises four enclosures A-D, each enclosure comprising at most one recovery pump:

one enclosure A housing the two fan bearings S #1 and S #2, the reduction mechanism 10 and the low-pressure bearings BP #1 and BP #4.
one enclosure B housing the front high-pressure bearing HP #1.
one enclosure C housing the rear high-pressure bearing HP #2.
one enclosure D housing the low-pressure bearings BP #2 and BP #3.

The second and third low-pressure bearings BP #2 and BP #3 are connected to the exhaust casing. Furthermore, the low-pressure shaft is connected to the low-pressure turbine casing, between the rear high-pressure bearing HP #2 and the second low-pressure bearing BP #2.

In one embodiment, the turbofan 1 can comprise exactly three recovery pumps, namely one pump for enclosure A, one pump for enclosure B and one pump configured to recover the oil in enclosures C and D.

This exemplary embodiment is therefore identical to that illustrated in FIG. 1*e*, except that the low-pressure bearing BP #4 is placed in enclosure A rather than in enclosure B.

The exemplary embodiment illustrated in FIG. 2*b* is identical to that illustrated in FIG. 2*a*, except that the low-pressure bearing BP #2 is placed in enclosure C, the second low-pressure bearing BP #2 is connected to the inter-turbine casing and the connection 14 extends optionally between the second BP #2 and the third low-pressure bearing BP #3. The turbofan 1 can thus comprise a most four recovery pumps, namely one recovery pump per enclosure A to D, or as a variant exactly three recovery pumps, using a single pump to recover the oil in enclosures C and D.

The exemplary embodiment illustrated in FIG. 2c is identical to that illustrated in FIG. 2a, except that the rear high-pressure bearing HP #2 and the low-pressure bearings BP #2 and BP #3 are each placed in a respective enclosure C, D, E. As a variant, the second low-pressure bearing BP #2 could be connected to the inter-turbine casing. In this exemplary embodiment, the turbofan 1 therefore comprises five enclosures A-E, each enclosure comprising at most one recovery pump. As a variant, the turbofan could comprise exactly 3 or 4 recovery pumps, by using a single recovery pump to recover the oil in enclosures C and D, or D and E, or C, D and E.

The exemplary embodiment illustrated in FIG. 2d is identical with that illustrated in FIG. 2a, except that the turbofan 1 comprises only the enclosures A, B and C, the enclosure C housing the rear high-pressure bearing HP #2 and the low-pressure bearings BP #2 and BP #3. As a variant, the second low-pressure bearing BP #2 could be connected to the inter-turbine casing. In this exemplary embodiment, the turbofan 1 therefore comprises at most three recovery pumps, namely one recovery pump per enclosure A to C.

The exemplary embodiments illustrated in FIGS. 2e to 2h are identical with those illustrated in FIGS. 2a to 2d, respectively, except that the low-pressure bearing BP #4 is supported by the inlet casing (just like the low-pressure bearing BP #1), i.e. by the casing which extends between the fan 2 and the booster 3a.

Optionally, the turbofan 1 may not comprise a second low-pressure bearing BP #2 or a third low-pressure bearing BP #3, similarly to what has been described and illustrated with reference to FIGS. 1b, 1d, 1f and 1g.

In the exemplary embodiment illustrated in FIGS. 3a to 3c, the turbofan 1 comprises two fan bearings S #1 and S #2, a reduction mechanism 10, two high-pressure bearings HP #1 and HP #2 and exactly three low-pressure bearings BP #1, BP #2 and BP #3.

In the exemplary embodiment illustrated in FIG. 3a, the turbofan 1 comprises four enclosures A-D:
  one enclosure A housing the two fan bearings S #1 and S #2, the reduction mechanism 10 and the low-pressure bearing BP #1,
  one enclosure B housing the front high-pressure HP #1.
  one enclosure C housing the rear high-pressure bearing HP #2.
  one enclosure D housing the low-pressure bearings BP #2 and BP #3.

In this exemplary embodiment, the turbofan 1 comprises at most four recovery pumps, namely one recovery pump per enclosure A to D. As a variant, the turbofan 1 could comprise exactly 3 pumps, by using a single recovery pump for recovering the oil in enclosures C and D.

The second and third low-pressure bearings BP #2 and BP #3 are connected to the exhaust casing. Furthermore, the low-pressure shaft is connected to the low-pressure turbine casing, between the rear high-pressure bearing HP #2 and the second low-pressure bearing BP #2.

The exemplary embodiment illustrated in FIG. 3b is identical to that illustrated in FIG. 1a, except that the low-pressure bearing BP #2 is placed in the enclosure C (with the rear high-pressure bearing HP #2) and the second low-pressure bearing BP #2 is connected to the inter-turbine casing and the connection 14 extends optionally between the second BP #2 and the third low-pressure bearing BP #3. In this exemplary embodiment, the turbofan 1 comprises at most four recovery pumps, namely one recovery pump per enclosure A to D. As a variant, the turbofan 1 could comprise exactly three pumps, by using a single recovery pump for recovering the oil in enclosures C and D.

The exemplary embodiment illustrated in FIG. 3c is identical with that illustrated in FIG. 3b, except that the rear high-pressure bearing HP #2 and the low-pressure bearings BP #2 and BP #3 are each placed in a respective enclosure C, D, E. As a variant, the second low-pressure bearing BP #2 could be connected to the exhaust casing, in which case the connection 14 extends optionally between the rear high-pressure bearing HP #2 and the second low-pressure bearing BP #2. In this exemplary embodiment, the turbofan 1 comprises at most five enclosures A-E, each enclosure comprising at most one recovery pump. As a variant, the turbofan could comprise exactly three or four recovery pumps, by using a single recovery pump for recovering the oil in enclosures C and D, or D and E, or C, D and E.

The exemplary embodiment illustrated in FIG. 3d is identical to that illustrated in FIG. 3b, except that the turbofan 1 comprises only the enclosures A, B and C, the enclosure C housing the rear high-pressure bearing HP #2 and the low-pressure bearings BP #2 and BP #3. In this exemplary embodiment, the turbofan 1 comprises exactly three recovery pumps.

The exemplary embodiments illustrated in FIG. 3e to 3h are identical to those illustrated in FIGS. 3a to 3d, respectively, except that the low-pressure bearing BP #1 is not placed in the enclosure A, but in a distinct enclosure F, upstream of the enclosure B of the front high-pressure bearing HP #1.

The exemplary embodiments illustrated in FIG. 3i to 3l are identical to those illustrated in FIGS. 3a to 3d, respectively, except that the low-pressure bearing BP #1 is placed this time in the same enclosure B as the front high-pressure bearing HP #1, and not in the front enclosure A or in the enclosure F.

In one embodiment, the high-pressure shaft 8 can further comprise a third high-pressure bearing (not visible in the figures), placed between the front bearing HP #1 and the rear bearing HP #2. In this case, regardless of the exemplary embodiment, the bearing HP #3 is placed in the vicinity of the front high-pressure bearing HP #1, or even housed in the enclosure B with the front high-pressure bearing HP #1.

Optionally, regardless of the embodiment, the enclosure which houses the front bearing HP #1 (generally the enclosure B) also houses the gear set 12 configured to collect power on the high-pressure shaft 8. This configuration thus allows sharing the lubrication of the gear set in question and of the front bearing HP #1.

In one exemplary embodiment, the front bearing HP #1 of the high-pressure shaft 8 comprises a ball bearing while the rear bearings HP #2 and HP #3 comprise roller bearings.

Also optionally, regardless of the embodiment, the second low-pressure bearing BP #2 can be eliminated. In this case, the low-pressure shaft is supported by a single rear bearing (BP #3) and one or two front bearings (BP #1 and BP #4).

The front fan bearing S #1 can be of the roller bearing type and comprise coaxial inner ring and outer ring between which the rollers are mounted.

The rear fan bearing S #2 can be of the ball bearing type and comprise coaxial inner ring and outer ring between which the balls are mounted.

By way of comparison, in the prior art, the front fan bearing S #1 and the rear fan bearing S #2 each comprise a conical roller bearing, which are dynamically comparable to a single bearing. By opposition, the implementation of a roller bearing and of a ball bearing for the front fan bearing and the rear fan bearing respectively thus allows having two "real ones," thus allowing more accurate guidance in rotation.

The low-pressure bearing BP #1 can be of the ball bearing type and comprise coaxial inner ring and outer ring between which the balls are mounted.

The low-pressure bearings BP #2, BP #3 and if necessary BP #4 can be of the roller bearing type.

The enclosures A to C (and if necessary D and E) can be vented or non-vented.

By non-vented enclosure is meant here an enclosure which is not directly in fluid communication with the open air and which does not comprise a degassing tube. To this end, an oil recovery pump connected to a recovery port can be placed in a low point of the engine so as to recovery the oil and the air of the non-vented enclosure and thus create an aspiration of air through the seals of the enclosure. The pump advantageously has a pumping flow rate greater than that of the incoming oil supply in the enclosure allowing lubrication of the bearing(s) and if necessary of the reduction mechanism 10. In this case, it is preferably to have an airflow through the two seals, upstream and downstream, so as to retain the oil at the two seals. Moreover, so that there are flows of air passing through the two seals of the oil enclosure, it is preferable that the pressure upstream of the two seals be substantially equal in order to avoid the formation of a preferred channel of the air flow which would compromise the sealing performance of one of the seals.

By vented enclosure is meant here an enclosure capable of being in communication with the open air while being held at a pressure close to atmospheric pressure. The bearings at the interior of such enclosures are bathed by the oil fog which is extracted from the enclosure continuously by a degassing tube, the air and the oil then being separated in an oil separator. In such an enclosure, the recovery pump has a pumping flow rate substantially equal to that of the incoming oil supply into the enclosure (via the spray nozzles). Furthermore, it is possible to have flows of air passing through the upstream and downstream seals of the enclosure, said flows of air having a pressure greater than or equal to that prevailing in the enclosure.

In one embodiment, when the enclosure comprises at most two seals, the enclosure is preferably non-vented. Likewise, when the enclosure comprises more than two seals, the enclosure is vented.

Typically, regardless of the embodiment, the enclosure A is preferably vented to the extent that it comprises systematically a first seal corresponding to the interface between the fan 2 rotor and the fan 2 casing (the enclosure A housing the fan bearings S #1 and S #2), a second interface between the fan shaft 7 and the low-pressure shaft 6 (enclosure A housing the reduction mechanism 10) and a third interface between the low-pressure shaft 6 and the inter-compressor casing (the enclosure A housing the low-pressure bearing BP #1). This enclosure A therefore necessarily comprises a dedicated recovery pump.

In the exemplary embodiments illustrated in FIGS. 1c, 2c, 2g, 3c, 3g and 3k, the rear bearings HP #2, BP #2 and BP #3 are each housed in a respective enclosure C, D and E. These enclosures C, D, E can therefore be non-vented. Furthermore, for these enclosures and as described with reference to the figures above, the recovery pumps can (optionally) be shared, i.e. the lubrication unit comprises at most three recovery pumps for recovering oil in these three enclosures C. D and E, preferably exactly two recovery pumps, or even a single recovery pump.

However, in the exemplary embodiments illustrated in FIGS. 2d, 2h, 3d, 3h and 3l, the rear bearings HP #2, BP #2 and BP #3 are all three housed in the same single enclosure C, which is therefore preferable vented. In this case, a recovery pump is associated with this enclosure C.

In the exemplary embodiments illustrated in FIGS. 1c, 1d, 2a-2h and 3a-3h, the enclosures B can be non-vented, these comprising only the front high-pressure bearing HP #1. In this case, a recovery pump is associated with this enclosure B.

In the examples illustrated in FIGS. 1a-1d. 1g, 2a, 2e, 3a, 3e and (respectively 1b, 1d, 1e, 2b, 2f, 3b, 3f and 3j) the enclosure C (respectively the enclosure D) houses only the rear high-pressure bearing HP #2 (respectively only the rear bearing BP #3) and can therefore be non-vented, while the enclosure D (respectively the enclosure C) houses two bearings and can therefore be vented or non-vented. Recovery pumps can therefore be shared for these enclosures, in which case the lubrication unit comprises fewer recovery pumps than there are enclosures.

Optionally, in the exemplary embodiments illustrated in FIGS. 1a-1d, the enclosures B can be vented to the extent that they house two bearings (BP #1 and HP #1).

The implementation of non-vented enclosures has the advantage of reducing the consumption of air collected at the high-pressure compressor 3b, and therefore increasing the quantity of air entering the combustion chamber 4, thus improving the performance of the turbofan 1. It is not however possible to put non-vented enclosures everywhere because, beyond two seals, it proves difficult to maintain pressure equilibrium upstream of the seals.

The invention claimed is:

1. A turbofan comprising:
   a low-pressure shaft supported by at least three low-pressure bearings,
   a high-pressure shaft supported by at least two high-pressure bearings,
   a fan shaft supported by at least two fan bearings,
   a reduction mechanism, coupling the low-pressure shaft and the fan shaft, and
   at most six enclosures,
   wherein the at most six enclosures house the at least three low-pressure bearings, the at least two high-pressure bearings, the at least two fan bearings, and the reduction mechanism, and
   wherein a first and a second of the at least three low-pressure bearings are positioned between the at least two fan bearings and the at least two high-pressure bearings.

2. The turbofan according to claim 1, comprising at most five enclosures.

3. The turbofan according to claim 1, wherein each enclosure comprises at most one recovery pump.

4. The turbofan according to claim 1, wherein the low-pressure shaft, the high-pressure shaft and the fan shaft are supported by eight or nine bearings in all.

5. The turbofan according to claim 1, wherein the at least two fan bearings, the reduction mechanism, and at least one of the at least three low-pressure bearing are housed in the same single enclosure.

6. The turbofan according to claim 1, wherein:
   the at least two high-pressure bearings comprise a front high-pressure bearing and a rear high-pressure bearing, the at least three low-pressure bearings comprise a front low-pressure bearing and a rear low-pressure bearing, the rear high-pressure bearing and the rear low-pressure bearing each being housed in distinct enclosures.

7. The turbofan according to claim 1, wherein:

the at least two high-pressure bearings comprise a front high-pressure bearing and a rear high-pressure bearing, the at least three low-pressure bearings comprise a front low-pressure bearing and a rear low-pressure bearing, the rear high-pressure bearing and the rear low-pressure bearing being housed in the same single enclosure.

8. The turbofan according to claim 1, wherein the at least three low-pressure bearings comprise four low-pressure bearings, a third and a fourth of the at least three low-pressure bearings being positioned downstream of the at least two high-pressure bearings, upstream and downstream being defined according to a direction of gas flow in the turbofan.

9. The turbofan according to claim 1, having a bypass ratio greater than or equal to 10.

10. The turbofan according to claim 1, wherein the reduction mechanism comprises a star gear reduction mechanism having a reduction ratio comprised between 2.6 and 5.

11. The turbofan according to claim 1, having a bypass ratio greater than or equal to 18.

12. The turbofan according to claim 1, having a bypass ratio between 12 and 18.

13. A turbofan comprising:

a low-pressure shaft supported by four low-pressure bearings, a high-pressure shaft supported by at least two high-pressure bearings, a fan shaft supported by at least two fan bearings, a reduction mechanism, coupling the low-pressure shaft and the fan shaft, and at most six enclosures, wherein the at most six enclosures house the at least three low-pressure bearings, the at least two high-pressure bearings, the at least two fan bearings and the reduction mechanism, wherein a first and a second of the four low-pressure bearings is positioned between the at least two fan bearings and the at least two high-pressure bearings and a third and a fourth of the four low-pressure bearings are positioned downstream of the at least two high-pressure bearings, and wherein upstream and downstream are defined according to a direction of gas flow in the turbofan.

14. The turbofan according to claim 13, wherein the at least two fan bearings, the reduction mechanism and at least one of the four low-pressure bearings are housed in the same single enclosure.

15. The turbofan according to claim 13, wherein:

the at least two high-pressure bearings comprise a front high-pressure bearing and a rear high-pressure bearing, the four low-pressure bearings comprise a front low-pressure bearing and a rear low-pressure bearing, the rear high-pressure bearing and the rear low-pressure bearing being housed in the same single enclosure.

16. The turbofan according to claim 13, wherein the reduction mechanism comprises a star gear reduction mechanism having a reduction ratio comprised between 2.6 and 5.

\* \* \* \* \*